(12) United States Patent
Huber et al.

(10) Patent No.: US 9,785,517 B2
(45) Date of Patent: Oct. 10, 2017

(54) REBUILDING DAMAGED AREAS OF A VOLUME TABLE USING A VOLUME DATA SET

(71) Applicant: INTERNATIONAL BUSINESS MACHINES CORPORATION, Armonk, NY (US)

(72) Inventors: Harold S. Huber, Scottsdale, AZ (US); Joseph V. Malinowski, Bridgeview, IL (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 14/735,608

(22) Filed: Jun. 10, 2015

(65) Prior Publication Data

US 2016/0364302 A1 Dec. 15, 2016

(51) Int. Cl.
*G06F 11/14* (2006.01)
*G06F 3/06* (2006.01)

(52) U.S. Cl.
CPC ........ *G06F 11/1469* (2013.01); *G06F 3/0617* (2013.01); *G06F 3/0632* (2013.01); *G06F 3/0661* (2013.01); *G06F 3/0673* (2013.01); *G06F 2201/805* (2013.01); *G06F 2201/85* (2013.01)

(58) Field of Classification Search
CPC .... G06F 3/0617; G06F 3/0632; G06F 3/0661; G06F 3/0673; G06F 11/1469; G06F 11/1435
See application file for complete search history.

(56) References Cited

U.S. PATENT DOCUMENTS

| 5,930,824 A * | 7/1999 | Anglin | G06F 11/1469 |
| | | | 345/418 |
| 6,529,995 B1 * | 3/2003 | Shepherd | G06F 11/1435 |
| | | | 707/999.202 |
| 7,146,485 B1 * | 12/2006 | Selkirk | G06F 3/0619 |
| | | | 711/206 |

(Continued)

OTHER PUBLICATIONS

VS Operating System Internals Manual. Sep. 1989. Wang Laboratories, Inc. 1$^{st}$ Edition.*

(Continued)

*Primary Examiner* — Gabriel Chu
*Assistant Examiner* — Paul Contino
(74) *Attorney, Agent, or Firm* — David W. Victor; Konrad Raynes Davda & Victor LLP (57) ABSTRACT

Provided a computer program product, system, and method for rebuilding damaged areas of a volume table using a volume data set for managing data sets assigned data units in a volume in a storage. A determination is made of damaged areas in a volume table providing information on data sets allocated in the volume. The determined damaged areas are formatted to produce reformatted areas to make the volume table usable. A volume data set in the volume having information on data sets configured in the volume is processed to determine from the volume data set salvaged data sets comprising the data sets in the volume not indicated in the volume table. Data set information is rebuilt in the reformatted areas of the volume table for the salvaged data sets.

21 Claims, 6 Drawing Sheets

(56) References Cited

U.S. PATENT DOCUMENTS

| | | | |
|---|---|---|---|
| 7,158,999 B2 | 1/2007 | Pace et al. | |
| 7,234,078 B2* | 6/2007 | Hida | G06F 11/1435 714/15 |
| 7,356,677 B1* | 4/2008 | Rafizadeh | G06F 9/4418 713/1 |
| 7,783,609 B2 | 8/2010 | Chauvet et al. | |
| 8,024,519 B2 | 9/2011 | Lehr et al. | |
| 8,140,886 B2 | 3/2012 | Lehr et al. | |
| 8,161,253 B2* | 4/2012 | Suarez | G06F 3/0619 711/114 |
| 8,782,360 B2 | 7/2014 | Cammarata et al. | |
| 8,880,939 B2 | 11/2014 | Hiramatsu et al. | |
| 9,384,088 B1* | 7/2016 | Jones | G06F 11/1064 |
| 2002/0087672 A1* | 7/2002 | Milligan | G06F 17/30353 709/223 |
| 2002/0087673 A1* | 7/2002 | Selkirk | G06F 11/1076 709/223 |
| 2002/0103980 A1* | 8/2002 | Crockett | G06F 3/0608 711/162 |
| 2004/0250172 A1* | 12/2004 | Patel | G06F 11/1435 714/42 |
| 2008/0120353 A1* | 5/2008 | Kwon | G06F 11/1435 |
| 2008/0256139 A1* | 10/2008 | Jessee | G06F 11/1435 |
| 2009/0006283 A1* | 1/2009 | Labrie | G06F 17/30303 706/12 |
| 2009/0055445 A1* | 2/2009 | Liu | G06F 17/30569 |
| 2009/0070537 A1* | 3/2009 | Cho | G06F 3/0623 711/162 |
| 2010/0094811 A1* | 4/2010 | Lehr | G06F 17/30067 707/674 |
| 2010/0185589 A1* | 7/2010 | Clarke | G06F 11/1469 707/674 |
| 2010/0191738 A1* | 7/2010 | Lehr | G06F 17/30123 707/741 |
| 2011/0060775 A1* | 3/2011 | Fitzgerald | G06F 11/1435 707/824 |
| 2011/0167302 A1* | 7/2011 | McCune | G06F 11/079 714/37 |
| 2011/0239052 A1* | 9/2011 | Nguyen | G06F 11/079 714/37 |
| 2011/0282846 A1* | 11/2011 | Shepard | G06F 11/0727 707/687 |
| 2012/0151250 A1* | 6/2012 | Saika | G06F 11/1417 714/4.11 |
| 2013/0046736 A1* | 2/2013 | Yu | G06F 11/1435 707/674 |
| 2013/0047032 A1 | 2/2013 | Chauvet et al. | |
| 2014/0006853 A1 | 1/2014 | Dudgeon et al. | |
| 2014/0089615 A1* | 3/2014 | Watanabe | G06F 11/1417 711/162 |

OTHER PUBLICATIONS

J. Sun, "IFC Catalog Management Overview", SHAREorg, Atlanta, 2012, pp. 58.

"DFSMSdfp Advanced Services", IBM Corporation, Version 1 Release 13 of z/OS (5694-A01), Document SC26-7400-14, Sep. 2012, pp. 534

"DFSMS Managing Catalogs", IBM Corporation, Version 2 Release 1, z/OS (5650-ZOS), Document SC23-6853-00, 2013, pp. 286.

M. Lovelace, et al., "VSAM Demystified", IBM Corporation, Document SG24-6105-02, Mar. 2013, pp. 458.

U.S. Patent Application with U.S. Appl. No. 14/624,482, filed Feb. 17, 2015, entitled "Correcting Overlapping Data Sets in a Volume", invented by H.S. Huber et al.,Total 32 pp. [18.560 (Appln)].

* cited by examiner

FIG. 1

FIG. 2 Volume Table

FIG. 3 Data Set Record

FIG. 4 Volume Data Set

FIG. 5 Volume Record

FIG. 6 Catalog Entry

REBUILDING DAMAGED AREAS OF A VOLUME TABLE USING A VOLUME DATA SET

BACKGROUND OF THE INVENTION

1. Field of the Invention

The present invention relates to a computer program product, system, and method for rebuilding damaged areas of a volume table using a volume data set.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage. For Virtual Storage Access Method (VSAM) data sets that are indexed by keys, the z/OS operating system provides VSAM volume data sets (VVDS) having records providing metadata for VSAM indexed data sets. The VTOC has information on non-VSAM data sets in the volume. The records in the VVDS comprise a VSAM Volume Record (VVR) providing metadata for VSAM data sets and non-VSAM Volume Records (NVR) providing metadata for non-VSAM or non-indexed data sets. (Z/OS is a registered trademark of IBM in the United States and other countries) The VSAM access method for data sets was introduced by International Business Machines Corporation.

Data records in the volume table providing information on the allocation of extents to data sets in a volume may become corrupted such as by overlaying data set records or by write operations that corrupt the data. Data corruption may be the result of program bugs, user errors, or Original Equipment Manufacturer (OEM) interactions. This corruption often goes undetected until applications encounter errors due to incorrect or missing data. This type of corruption can expand throughout the volume the longer this error remains undetected, leading to system outages and lengthy recovery times.

Further, if the data set records in the VTOC become overlaid and corrupt, the actual data sets on the volume may still be intact, but they cannot be referenced without the metadata in the VTOC. If one track of the VTOC is overwritten, numerous data sets on that volume become inaccessible, resulting in a critical impact error.

SUMMARY

Provided a computer program product, system, and method for rebuilding damaged areas of a volume table using a volume data set for managing data sets assigned data units in a volume in a storage. A determination is made of damaged areas in a volume table providing information on data sets allocated in the volume. The determined damaged areas are formatted to produce reformatted areas to make the volume table usable. A volume data set in the volume having information on data sets configured in the volume is processed to determine from the volume data set salvaged data sets comprising the data sets in the volume not indicated in the volume table. Data set information is rebuilt in the reformatted areas of the volume table for the salvaged data sets.

DETAILED DESCRIPTION

Volume table records having information on data sets and extents allocated to the data sets may experience corruption by having data overlaid and other errors. When this type of error occurs, determining damaged areas of the VTOC that are overwritten may be difficult. Described embodiments provide techniques to determine whether a volume table has data set records that are damaged and a recovery method for rebuilding those entries having errors such as track overlay.

Figure 1:
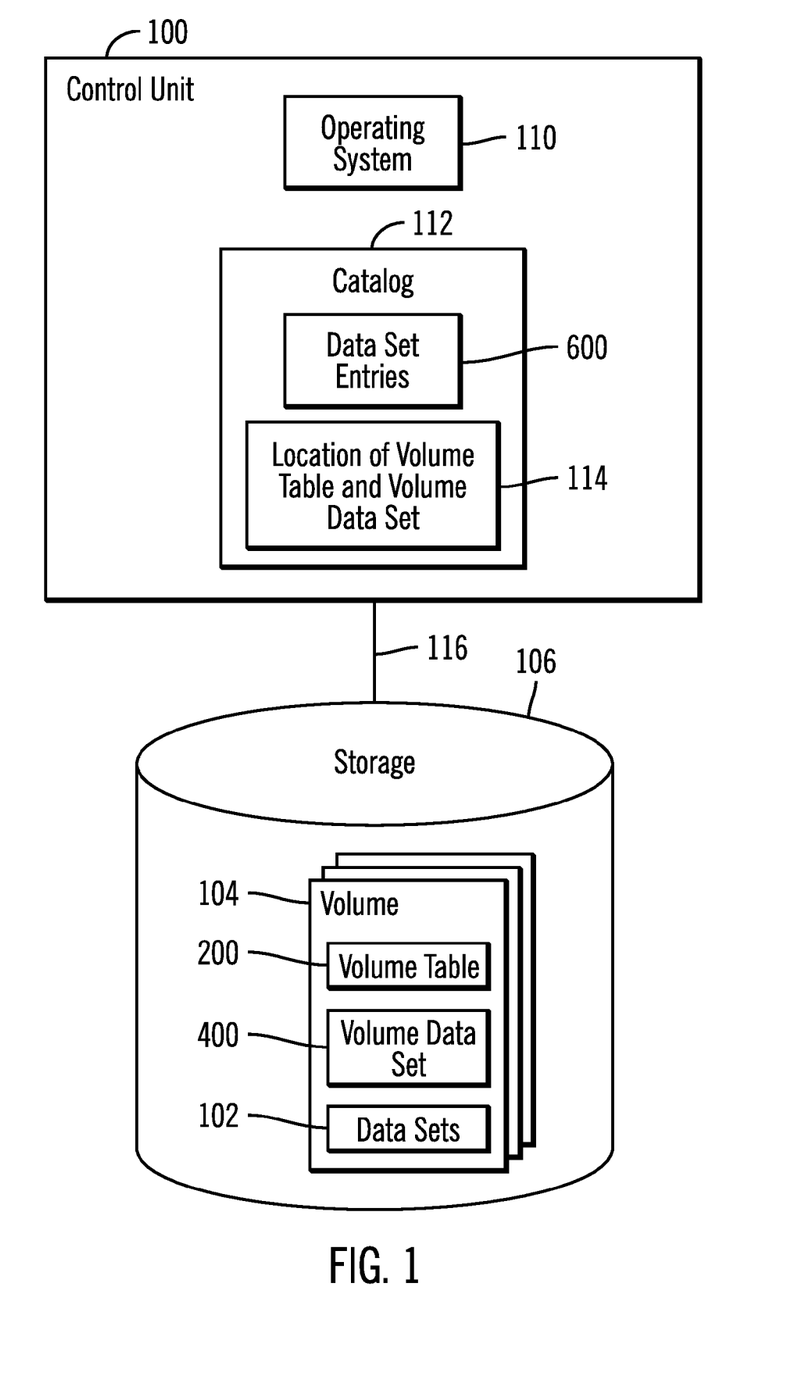
FIG. 1 illustrates an embodiment of a storage environment.

FIG. 1 illustrates an embodiment of a computing environment including a control unit 100, such as a storage controller or server, that manages access to data sets 102 configured in volumes 104 in a storage 106 by hosts (not shown). A data set 102 comprises a collection of data intended to be stored in a same logical allocation of data, such as data from a single application, user, enterprise, etc. A data set 102 may be comprised of separate files or records, or comprise a single file or record. Each record or file in the data set 102 may be comprised of extents of data or tracks.

The control unit 100 includes an operating system 110 to manage the storage of data sets 102 in the volumes 104. The operating system 110 may comprise the IBM z/OS® operating system or other operating systems for managing data sets in volumes or other logical data structures. The operating system 110 may further include a particular component for managing data in the volumes 104, such as the Data Facility Storage Management Subsystem (DFSMS) that automatically manages data from creation to expiration. (IBM, z/OS, and DFSMS are trademarks of IBM worldwide).

The operating system 110 creates a volume table 200 on the volume 104, including a mapping of tracks and extents of tracks to data sets 102. The volume table 200 may be stored in the volume 104, such as in the first few records of the volume, i.e., starting at the first track in the volume 104. In IBM z/OS operating system implementations, the volume table 200 may comprise a volume table of contents ("VTOC"). The volume tables 200 may comprise contiguous space data sets having contiguous tracks or physical addresses in the storage 106. In alternative embodiments, the volume table 200 may comprise a file allocation table stored separately from the volume 104 or within the volume 104.

In z/OS implementations, the volume table 200, e.g., VTOC, may include information on locations of data sets in the volume 104, such as a mapping of tracks in the data sets to storage locations in the volume. In alternative embodiments, the volume table 200 may comprise other types of file allocation data structures that provide a mapping of data to storage locations, either logical and/or physical storage locations. In this way, the volume table 200 provides a mapping of tracks to data sets 102 in the volume 104

Figure 2:
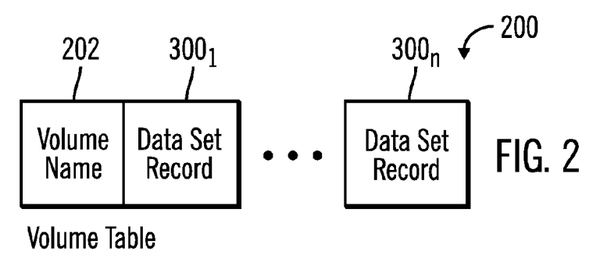
FIG. 2 illustrates an embodiment of a volume table.

FIG. 2 illustrates an embodiment of the volume table 200 as including a volume name 202 and one or more data set records $300_1 \ldots 300_n$ for each data set allocated in the volume 104. The volume name 202 also known as a volume serial number, e.g., a VOLSER, provides a unique identifier of the volume. The volume name 202 may be included in the name of the volume table 200 in the volume $104_i$. In embodiments where the operating system 110 comprises the Z/OS operating system, the data set records may comprise data set control blocks ("DSCBs").

Figure 3:
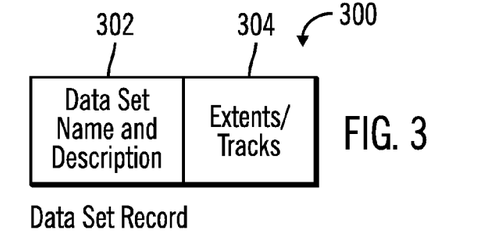
FIG. 3 illustrates an embodiment of a data set record.

FIG. 3 illustrates an embodiment of the data set records 300 of the volume table 302, such as data set records $300_1 \ldots 300_n$, as including a data set name and description 302 and the extents 304 allocated to the data set 302. Tracks may be stored in extents, which provide a mapping or grouping of tracks in the volume 102. The extents may be defined as tracks, where tracks may be expressed as disk, cylinder, head and record location (CCHHR), or other formats. Terms such as tracks, data units, blocks, extents, etc., may be used interchangeably to refer to a unit of data managed in the volume 104. The volume table 200 may be located at track 0 and cylinder 0 of the volume 104. Alternatively, the volume table 200 may be located at a different track and cylinder number than the first one.

Figure 4:
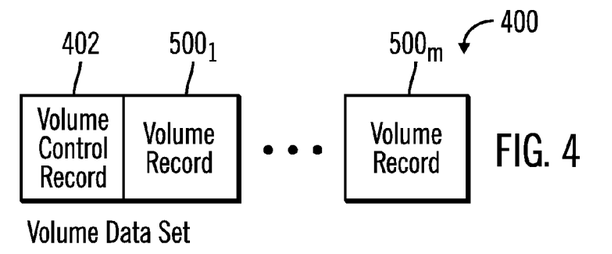
FIG. 4 illustrates an embodiment of a volume data set.
Figure 5:
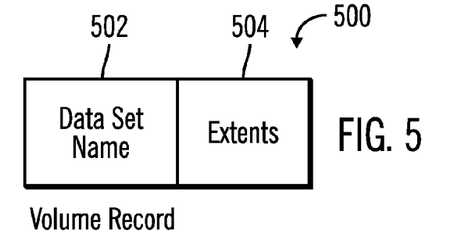
FIG. 5 illustrates an embodiment of a volume record in the volume data set.

The volume 104 may further include a volume data set 400, residing in the volume 104, that provides further information on the data sets 102 allocated in the volume 104, which is an extension of the volume table 200. In certain embodiments, the data sets 102 may conform to the Virtual Storage Access Method (VSAM) used for storing and accessing data sets, introduced by International Business Machines Corp. In such VSAM embodiments, the volume data set 400 may comprise a VSAM volume data set (VVDS) that provides information on the data sets 102 in the volume 104. As shown in FIG. 4, a volume data set 400 may be comprised of a volume control record 402 and one or more volume records $500_1 \ldots 500_m$, one for each data set configured in the volume 104. The volume control record 402 provides management information on the volume space, including catalog 112 names of catalogs that reference data sets in the volume 102. As shown in FIG. 5, each volume record 500, comprising one of the volume records $500_1 \ldots 500_m$, includes a data set name 502 and extents 504 in the storage 106 allocated to the data set 502. Extents comprise a grouping or arrangement of tracks in the storage 106 for assignment to data sets.

In VSAM embodiments, the volume records 500 may be either a VSAM volume record ("VVR") for data sets 102 conforming to the VSAM access method or non-VSAM records ("NVR") that are for non-VSAM data sets 102. VSAM data sets 102 are formatted differently than non-VSAM data sets. For instance, VSAM data sets are collections of records grouped into control intervals in a fixed area of the storage space, called control areas. Further, the VSAM records are indexed by a key and relative byte address. The non-VSAM data sets are collections of fixed or variable length records grouped into blocks, and not indexed by a key. For instance, in non-VSAM data sets, the records are sequenced by the order in which they are written to the data set, rather than by key field.

The operating system 110 may further maintain a catalog 112 that has further information on the data sets 102 and volume data set 400. The catalog 112 includes data set entries 600 having information on the data sets 102 configured in the volume 104 and a location 114 providing the location of the volume table 200 and the volume data set 400 in the volume 104, to allow access of those data structures for recovery.

Although certain embodiments and implementations of the operating system 110, volume table 104, volume data set 400 and data storage technologies are described with respect to the IBM VSAM access method and Z/OS operating system, the described embodiments may apply to other operating system and storage architectures from the same or different vendors. For instance, the embodiments may apply to operating systems that use different types of allocation or volume tables than a VTOC, different types of metadata on the allocation of storage to data sets than a VVDS, and different types of storage formats, access methods and architectures than VSAM.

Figure 6:
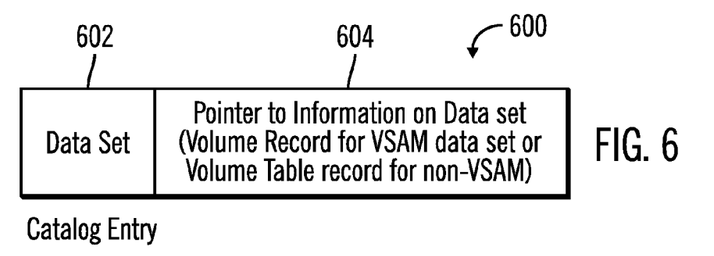
FIG. 6 illustrates an embodiment of a catalog entry in a catalog.

FIG. 6 illustrates an embodiment of a catalog entry 600 in the catalog 112 including a data set name 602 identifying one of the data sets 102 configured in the volume 104 and a pointer 114 to information on the data set 604, such as the volume record 500 for the data set 502. In VSAM embodiments, the pointer 604 provides the location of the volume record 500, e.g., VVR, for a VSAM data set, in the volume data set 400 and provides the location of the data set record 300 in the volume table 200 for the data set 302 for non-VSAM data sets, e.g., the NVR. In this way, the catalog 112 provides access to information on the location, such as tracks and extents, of data sets in the storage 106 that is maintained in the volume table 200 and volume data set 400.

The storage 106 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The control unit 100 communicates with the storage 106 via connection 116. The connection 116 may comprise one or more networks, such as a Local Area Network (LAN), Storage Area Network (SAN), Wide Area Network (WAN), peer-to-peer network, wireless network, etc. Alternatively, the connection 116 may comprise bus interfaces, such as a Peripheral Component Interconnect (PCI) bus or serial interface.

Figure 7:
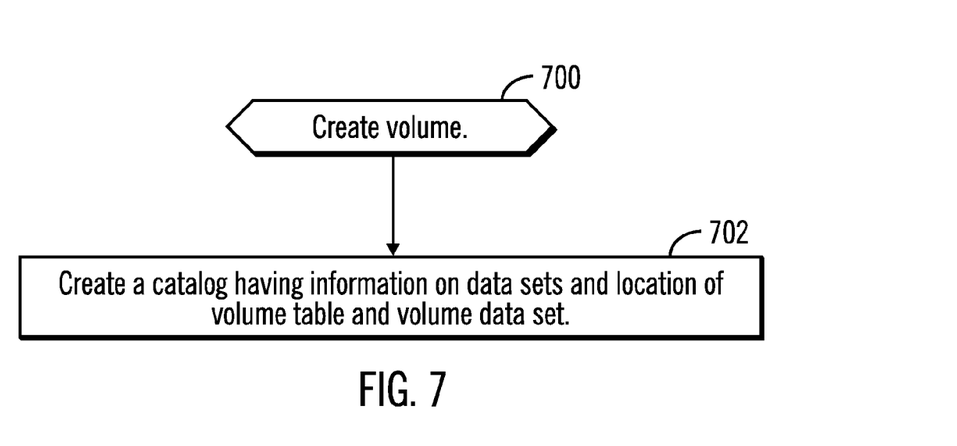
FIG. 7 illustrates an embodiment of operations to include information in a catalog for use in volume table recovery.

FIG. 7 illustrates an embodiment of operations performed by the operating system 110 or some other component to create the volume 104. Upon creating (at block 700) the volume 104 in the storage 106, the operating system 110 may create (at block 702) the catalog 112 and include a location 114 of the volume table 200 and the volume data set 400 for the volume 104. This location information 114 may allow the operating system 100 to locate the volume table 200 and the volume data set 400 if there is damage to certain of the tracks including the volume table 200.

Figure 8:
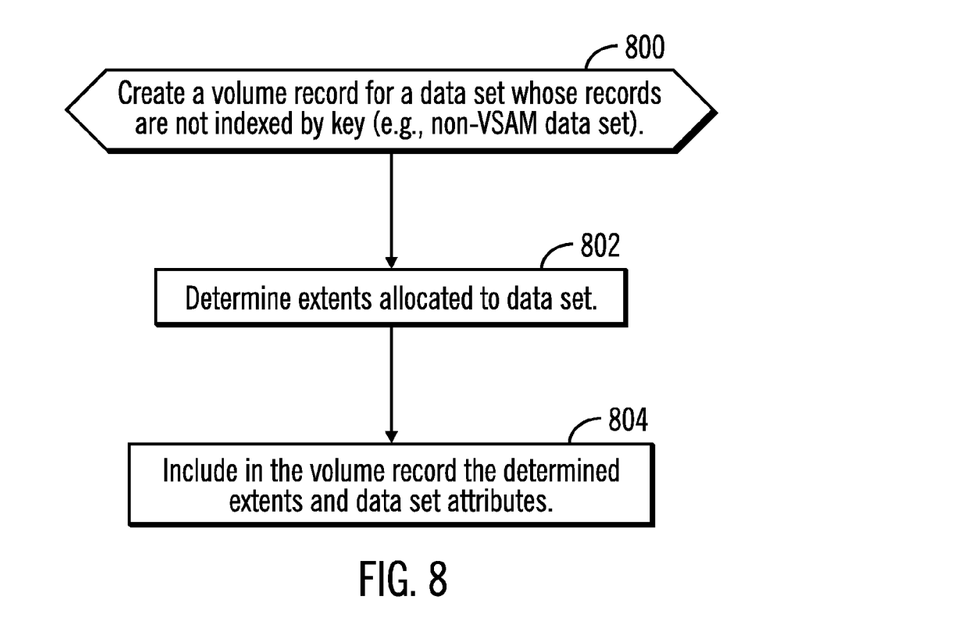
FIG. 8 illustrates an embodiment of operations to include information on data sets in a volume record in the volume data set.

FIG. 8 illustrates an embodiment of operations performed by the operating system 110 or some other component to supplement the information maintained for a volume record 500 for a data set that is not indexed, such as a non-VSAM data set, or NVR. Upon creating a volume record 500 for a data set 102 being configured in the volume 104 whose records are not indexed in the volume data set 400, such as an NVR for a non-VSAM data set, the operating system 110 determines (at block 802) the extents allocated to the data set 102 and includes (at block 804) the determined extents and further data set attributes in the volume record 500. In this way, a volume record 500 that would not otherwise have information on the extents for the data set, such as an NVR, is supplemented with information on the extents allocated to the data set 102. This information may then be used when recovering damaged areas of the volume table 104.

Figure 9A:
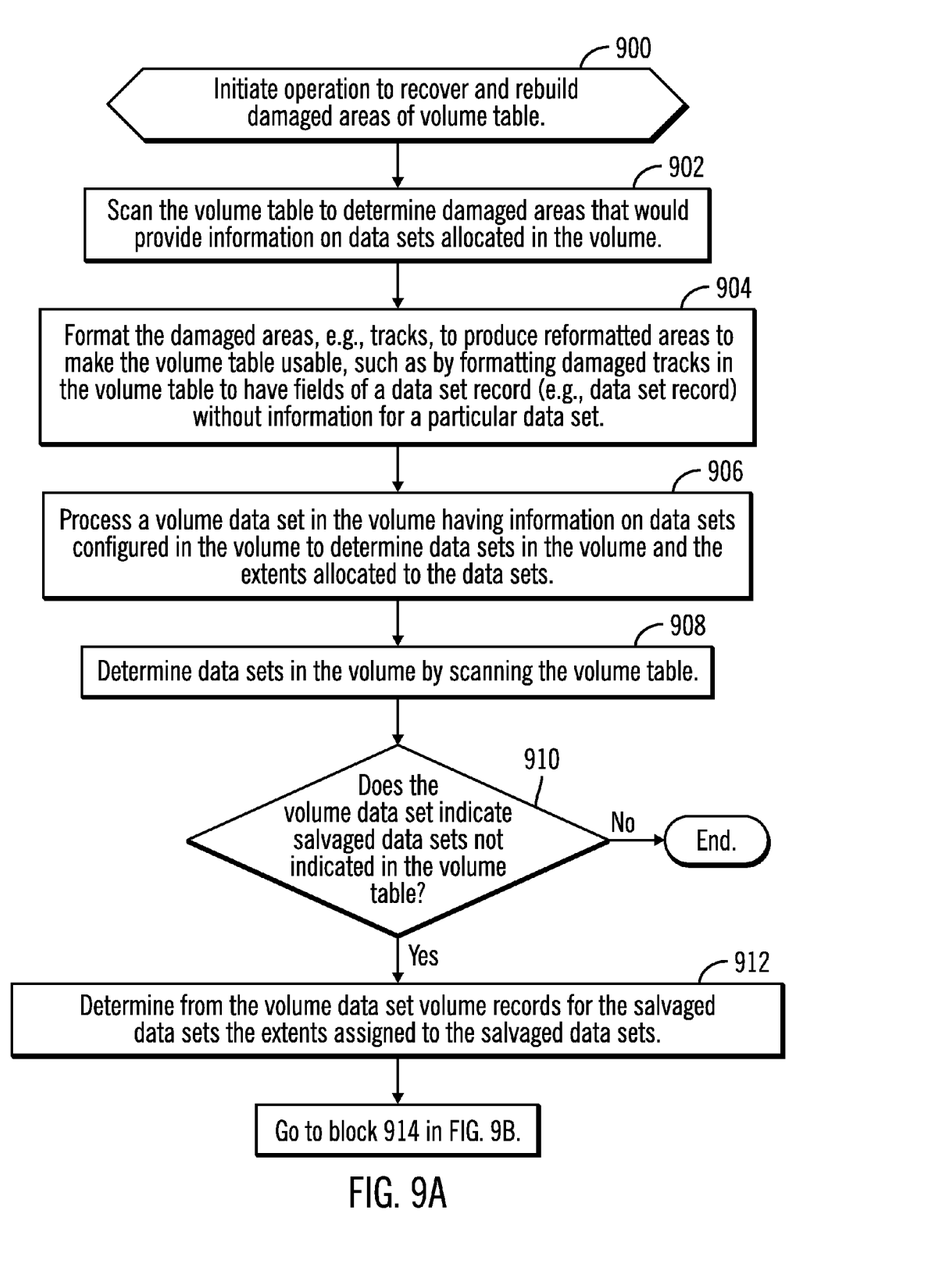
FIGS. 9a and 9b illustrate an embodiment of operations to rebuild damaged data areas in a volume table.
Figure 9B:
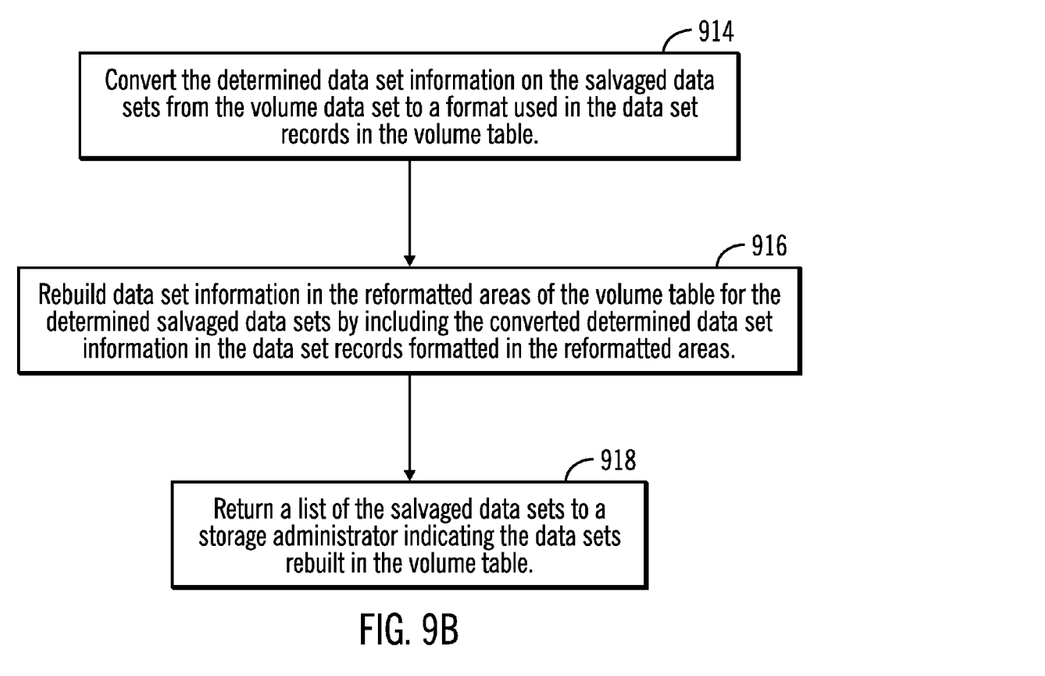

FIGS. 9a and 9b illustrates an embodiment of operations performed by the operating system 110 or some other component to rebuild damaged areas of the volume table 104 and the data records 300 that were included in those damaged areas, and are no longer readable. An operation to discover and rebuild damaged areas of the volume table 200 may be initiated (at block 900) when an application experiences errors accessing data sets 102 in the volume 104. In response to initiating the discovery and recovery, the operating system 110 scans (at block 902) the volume table 200 to determine damaged areas that would provide information on data sets 102 allocated in the volume. During operations, the volume table 200 tracks may become overlaid and the data set records 300 may become damaged or unusable. The scanning operation may analyze the entire space allocated to the volume table 200 to determine whether tracks for the data set records 300 are damaged, such as by determining that the tracks do not have valid data or data is not in the expected format for a data set record 300, which may occur if there are data write errors or the track has been overlaid.

The operating system 110 may then format (at block 904) the damaged areas, e.g., tracks, to produce reformatted areas to make the volume table 200 usable. The tracks in the damaged area of the volume table 200 space would be formatted by writing fields of a data set record (e.g., data set record) without information for a particular data set, i.e., empty or null values. For instance, the reformatting may involve writing empty data set control blocks (DSCBs) to the damaged tracks. The operating system 110 then processes (at block 906) the volume data set 400 in the volume 104 having information on data sets 102 configured in the volume 104 to determine information on data sets and the extents 504 allocated to the data sets indicated in the volume records $500_1 \ldots 500_m$ for the data sets. The operating system 110 further scans (at block 908) the volume table 200 data set records $300_1 \ldots 300_n$ to determine the data sets indicated in the volume table 200 allocated to the volume 102. The operating system 110 may determine the location of the volume table 200 and the volume data set 400 from the location information 114 in the catalog 112.

If (at block 910) the volume data set 400 identifies data sets 102 not indicated in the volume table 200, referred to herein as salvaged data sets, then the operating system 110 determines (at block 912) from the volume data set 400 volume records 500 for the salvaged data sets, the extents 504 assigned to the salvaged data sets.

Control then proceeds to block 914 in FIG. 9b where the operating system 110 converts the determined data set information on the salvaged data sets, such as the allocated extents 504, to a format used in the data set records 300, e.g., data set control blocks, in the volume table 200. The volume table data set 300 information is rebuilt (at block 916) in the reformatted areas of the volume table 200 for the determined salvaged data sets by including the converted determined data set information in the data set records 300 formatted in the areas reformatted at block 904. The operating system 110 may then return (at block 918) a list of the salvaged data sets to a storage administrator indicating the data sets rebuilt in the volume table 200.

Described embodiments provide techniques to rebuild damaged areas in a volume table for data set records by using information in a volume data set providing a separate source of information on the data sets, including the extents allocated to a data set. Described embodiments further provide techniques to supplement information in the catalog and volume records to include information on data sets for use in the volume table recovery and rebuilding operations.

The reference characters used herein, such as m and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
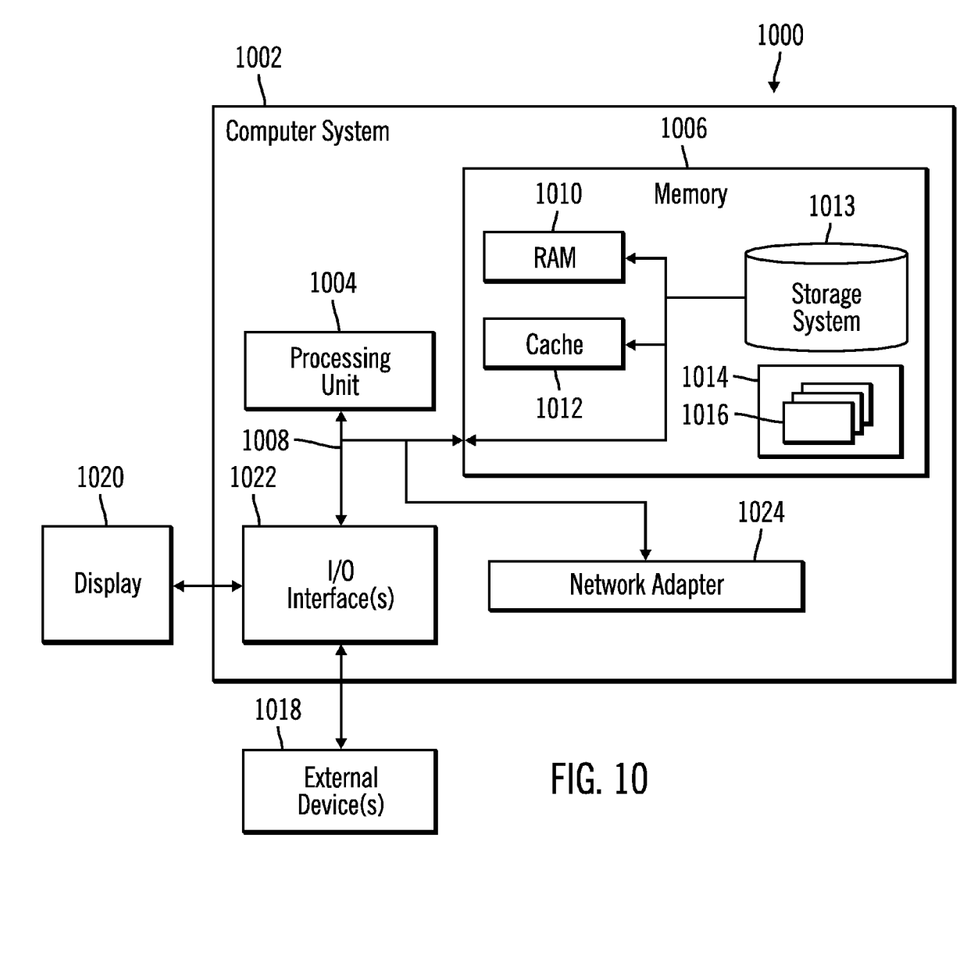
FIG. 10 illustrates a computing environment in which the components of FIG. 1 may be implemented.

The computational components of FIG. 1, including the control unit 100, may be implemented in one or more computer systems, such as the computer system 902 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data sets assigned data units in a volume in a storage, wherein the computer program product comprises a computer readable storage medium having program instructions embodied therewith, the program instructions executable by a processor to cause operations, the operations comprising:
   determining damaged areas in a volume table providing information on data sets allocated in the volume;
   formatting the determined damaged areas to produce reformatted areas by writing empty data to the determined damaged areas to make the volume table usable;
   processing a volume data set in the volume having information on data sets configured in the volume;
   determining, from the volume data set salvaged data sets comprising the data sets in the volume not indicated in the volume table; and
   rebuilding data set information in the reformatted areas of the volume table for the salvaged data sets.

2. The computer program product of claim 1, wherein the operations further comprise:
   indicating in a catalog stored external to the volume a location of the volume table and the volume data set.

3. The computer program product of claim 1, wherein a first type of data set comprises records indexed by keys and a second type of data set comprises records grouped into blocks, wherein the volume data set includes a first type of volume record for the first type of data set having extents in the volume for a data set name, wherein the operations further comprise:
   including, in a second type of volume, records for the second type of data set on extents in the volume assigned to data set names for the second type of data set.

4. The computer program product of claim 1, wherein the operations further comprise:

determining, from the volume data set, extents assigned to the salvaged data sets, wherein the rebuilding the data set information comprises including the data set information determined from the volume data set in the reformatted areas.

5. The computer program product of claim 4, wherein the volume data set has information on the data sets in the volume in a different format than data set records the volume table has on the data sets, wherein the operations further comprise:
converting the determined data set information on the data set from the volume data set to a format used in the data set records in the volume table, wherein the rebuilding the data set information comprises including the converted determined data set information in the data set records formatted in the reformatted areas.

6. The computer program product of claim 1, wherein the volume table has data set records having information on data sets configured in the volume, wherein the formatting the determined damaged areas comprises:
formatting damaged tracks in the volume table to have fields of a data set record without information for a particular data set.

7. The computer program product of claim 1, wherein the determining from the volume data set the data sets in the volume not indicated in the volume table comprises:
determining data sets in the volume by scanning the volume table;
determining data sets in the volume by scanning the volume data set for the volume; and
comparing the determined data sets from the volume table and the volume data set to determine the salvaged data sets indicated in the volume data set not indicated in the volume table.

8. The computer program product of claim 1, wherein the operations further comprise:
returning a list of the salvaged data sets to a storage administrator indicating the data sets rebuilt in the volume table.

9. The computer program product of claim 1, wherein the volume table comprises a volume table of contents, wherein the volume data set comprises a Virtual storage access method (VSAM) volume data set (VVDS), and wherein the VVDS includes VSAM volume records (VVRs) and non-VSAM volume records (NVRs) having information on data sets configured in the volume, wherein the VSRs and the NVRs in the VVDS are processed to determine the data sets configured in the volume.

10. A system for managing data sets assigned data units in a volume in a connected storage, comprising:
a processor; and
a computer readable storage medium including program code executed by the processor to perform operations, the operations comprising:
determining damaged areas in a volume table providing information on data sets allocated in the volume;
formatting the determined damaged areas to produce reformatted areas by writing empty data to the determined damaged areas to make the volume table usable;
processing a volume data set in the volume having information on data sets configured in the volume;
determining, from the volume data set, salvaged data sets comprising the data sets in the volume not indicated in the volume table; and
rebuilding data set information in the reformatted areas of the volume table for the salvaged data sets.

11. The system of claim 10, wherein a first type of data set comprises records indexed by keys and a second type of data set comprises records grouped into blocks, wherein the volume data set includes a first type of volume record for the first type of data set having extents in the volume for data set names, wherein the operations further comprise:
including in a second type of volume records for the second type of data set information on extents in the volume assigned to data set names for the second type of data set.

12. The system of claim 10, wherein the operations further comprise:
determining, from the volume data set extents assigned to the salvaged data sets, wherein the rebuilding the data set information comprises including the data set information determined from the volume data set in the reformatted areas.

13. The system of claim 10, wherein the volume table has data set records having information on data sets configured in the volume, wherein the formatting the determined damaged areas comprises:
formatting damaged tracks in the volume table to have fields of a data set record without information for a particular data set.

14. The system of claim 10, wherein the determining from the volume data set the data sets in the volume not indicated in the volume table comprises:
determining data sets in the volume by scanning the volume table;
determining data sets in the volume by scanning the volume data set for the volume; and
comparing the determined data sets from the volume table and the volume data set to determine the salvaged data sets indicated in the volume data set not indicated in the volume table.

15. The system of claim 10, wherein the volume table comprises a volume table of contents, wherein the volume data set comprises a Virtual storage access method (VSAM) volume data set (VVDS), and wherein the VVDS includes VSAM volume records (VVRs) and non-VSAM volume records (NVRs) having information on data sets configured in the volume, wherein the VSRs and the NVRs in the VVDS are processed to determine the data sets configured in the volume.

16. A method for managing data sets assigned data units in a volume in a storage, comprising:
determining damaged areas in a volume table providing information on data sets allocated in the volume;
formatting the determined damaged areas by writing empty data to the determined damaged areas to produce reformatted areas to make the volume table usable;
processing a volume data set in the volume having information on data sets configured in the volume;
determining, from the volume data set, salvaged data sets comprising the data sets in the volume not indicated in the volume table; and
rebuilding data set information in the reformatted areas of the volume table for the salvaged data sets.

17. The method of claim 16, wherein a first type of data set comprises records indexed by keys and a second type of data set comprises records grouped into blocks, wherein the volume data set includes a first type of volume record for the first type of data set having extents in the volume for data set names, further comprising:

including in a second type of volume records for the second type of data set on extents in the volume assigned to data set names for the second type of data set.

18. The method of claim 16, further comprising:
determining, from the volume data set, extents assigned to the salvaged data sets, wherein the rebuilding the data set information comprises including the data set information determined from the volume data set in the reformatted areas.

19. The method of claim 16, wherein the volume table has data set records having information on data sets configured in the volume, wherein the formatting the determined damaged areas comprises:
formatting damaged tracks in the volume table to have fields of a data set record without information for a particular data set.

20. The method of claim 16, wherein the determining from the volume data set the data sets in the volume not indicated in the volume table comprises:

determining data sets in the volume by scanning the volume table;

determining data sets in the volume by scanning the volume data set for the volume; and comparing the determined data sets from the volume table and the volume data set to determine the salvaged data sets indicated in the volume data set not indicated in the volume table.

21. The method of claim 16, wherein the volume table comprises a volume table of contents, wherein the volume data set comprises a Virtual storage access method (VSAM) volume data set (VVDS), and wherein the VVDS includes VSAM volume records (VVRs) and non-VSAM volume records (NVRs) having information on data sets configured in the volume, wherein the VSRs and the NVRs in the VVDS are processed to determine the data sets configured in the volume.

* * * * *